No. 824,300. PATENTED JUNE 26, 1906.
D. F. HUNT.
PARER FOR APPLES AND OTHER FRUIT.
APPLICATION FILED MAY 16, 1904.
2 SHEETS—SHEET 1.
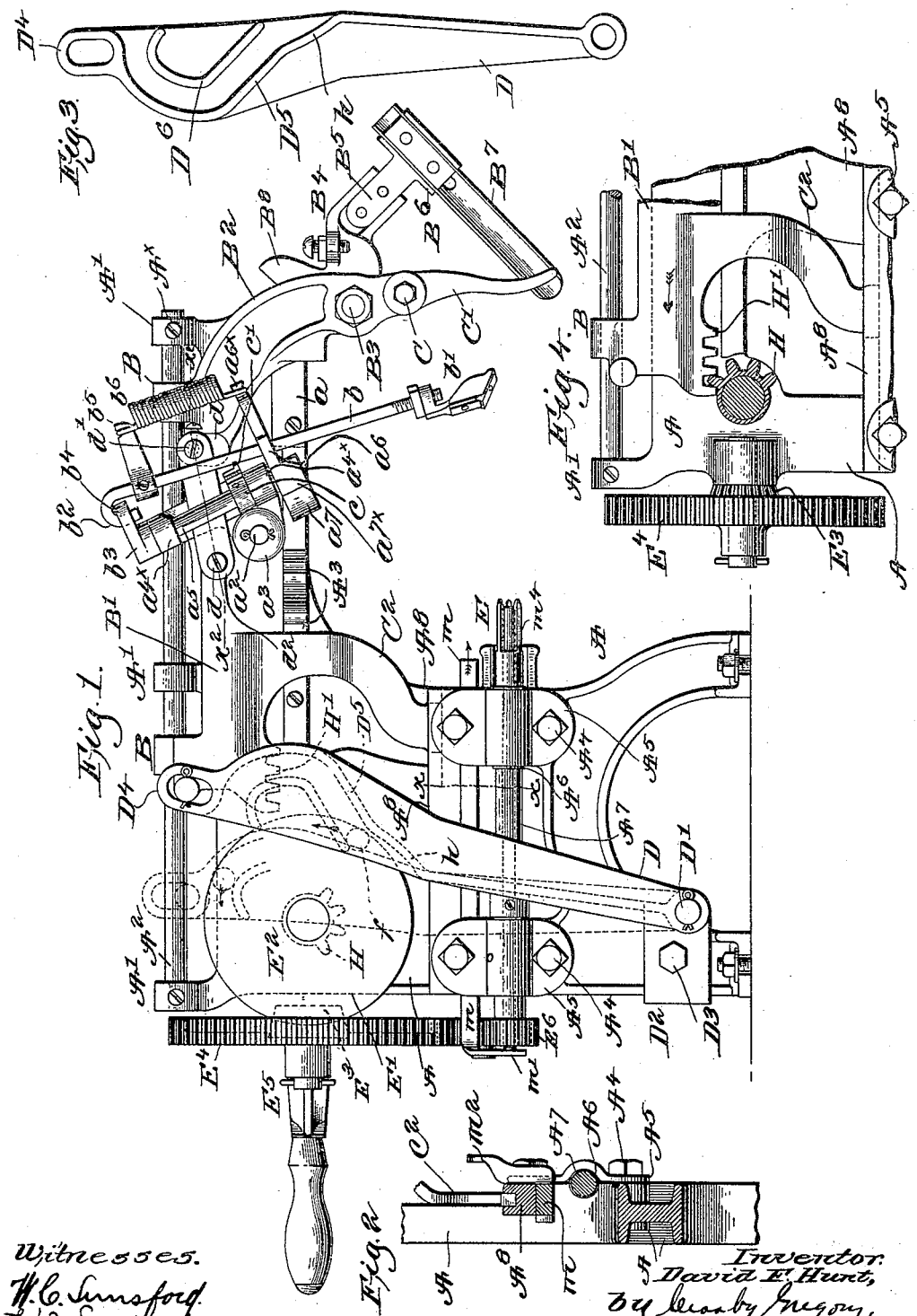
Witnesses.
Inventor.
David F. Hunt,

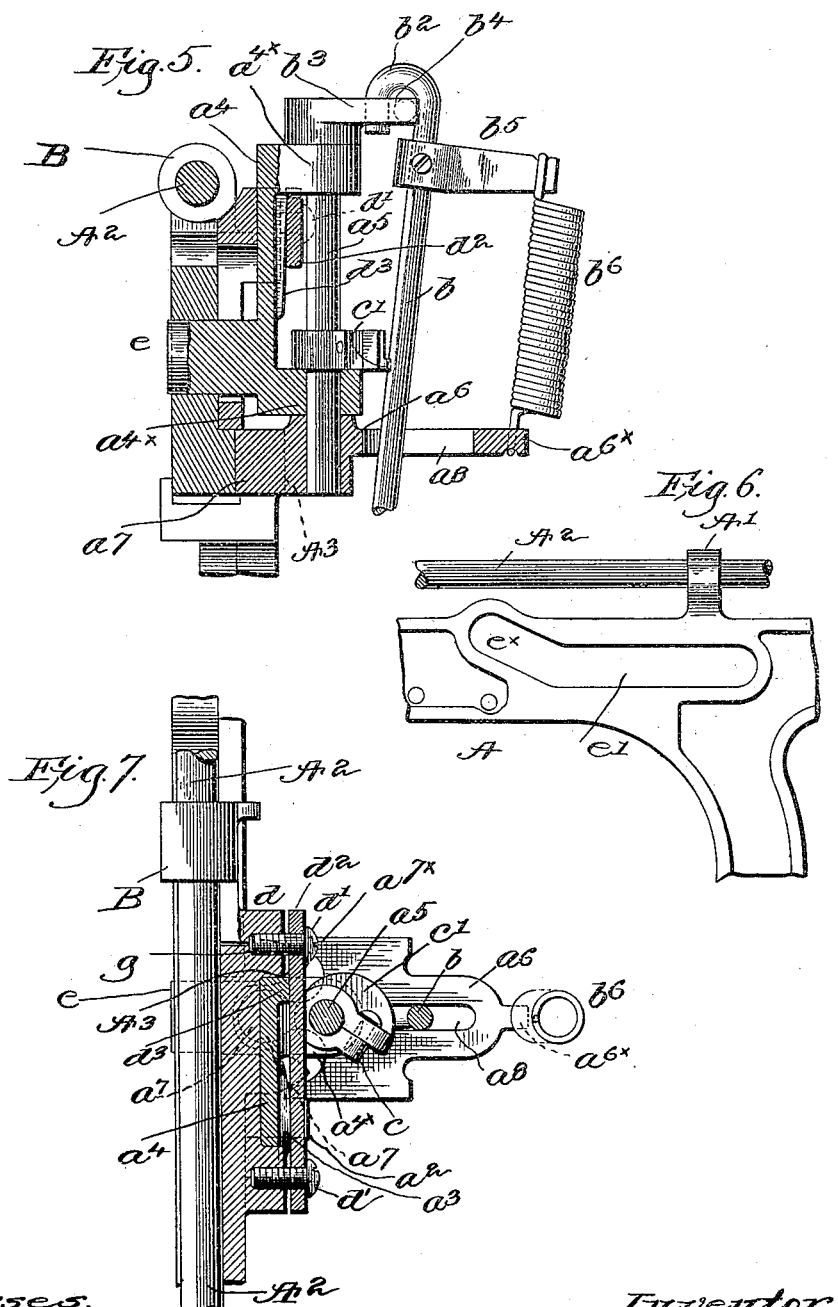

UNITED STATES PATENT OFFICE.

DAVID F. HUNT, OF ANTRIM, NEW HAMPSHIRE, ASSIGNOR TO GOODELL COMPANY, OF ANTRIM, NEW HAMPSHIRE.

PARER FOR APPLES AND OTHER FRUIT.

No. 824,300. Specification of Letters Patent. Patented June 26, 1906.

Application filed May 16, 1904. Serial No. 208,079.

*To all whom it may concern:*

Be it known that I, DAVID F. HUNT, a citizen of the United States, residing at Antrim, in the county of Hillsboro and State of New Hampshire, have invented an Improvement in Parers for Apples and other Fruits, of which the following description, in connection with the accompanying drawings, is a specification, like letters on the drawings representing like parts.

This invention has for its object the production of a novel and excessively simple machine for paring fruit, the same being adapted to be used by hand or power.

In my novel machine I employ a radius-bar having cam-ledges that are engaged by a crank pin or stud extended from a disk or preferably a bevel-toothed gear, said gear having at its rear side a mutilated gear that acts intermittingly to move longitudinally a carriage upon which is mounted the turn-table carrying the usual paring-knife.

In my novel machine the radius-bar is made the mover for the carriage and turn-table as the latter are moved outwardly after having pared an apple to place the knife in its position farthest from the usual fork and also for moving the carriage, turn-table, and knife-carrier toward the fruit to be pared, and for moving the knife-carrier from the "bud end," we may say, of the apple onto the side thereof, and thereafter the mutilated gear engages and completes the inward movement of the carriage, turn-table, and knife-carrier during the operation of paring the fruit from near its median line to its base or larger end.

The mutilated gear and the toothed part of the carriage constitute what is hereinafter designated as "independent driving means," its purpose being to take the inwardly-moving carriage when a part of the side of the apple has been turned and continue its movement during the paring operation, thus relieving the radius-bar D from the duty of moving the carriage throughout the entire operation of paring the side of the apple.

Figure 1 in side elevation represents a fruit-paring machine embodying my present invention, the full lines showing the paring-knife, corer, and other parts in their extreme inoperative position, the radius-bar, however, being shown in dotted line in the position that it occupies when the paring-blade has completed the paring operation. Fig. 2 is a section in the line $x\ x$, Fig. 1, looking to the left. Fig. 3 is an inner side view of the radius-bar. Fig. 4 is a view showing the mutilated gear as just engaging the rack-teeth of the carriage to continue to move the same inwardly independently of the radius-bar. Fig. 5 is an enlarged sectional detail showing the turn-table and the carriage sustaining the same, together with part of the rod sustaining the paring-knife. Fig. 6 is a rear side view of the frame, showing the slot in which travels the stud projecting backwardly from the arm carrying the turn-table; and Fig. 7 is a section below the line $x^2$, Fig. 5.

In the drawings, A represents the framework of the machine, it having at its upper end suitable bosses A', that receive a guide-rod A², which is fixed in said bosses by suitable screws A$^\times$. The framework sustains a bar having teeth A³, usually two, that are engaged at times, as will be stated, by teeth of the turn-table, to be described. The framework also has connected with it by bolts A⁴ caps A⁵, that embrace bearings A⁶, in which revolves the hollow coring-shaft A⁷, the upper bolts extended through said caps also holding in place a grooved track A⁸. (Shown in section in Fig. 2.)

The guide-rod receives loosely bosses B of a carriage B', having depending from its outer end an arm B², that receives a bolt B³, that pivotally connects with said arm the core-carrying lever B⁴, said lever being grooved at one side to receive the shank B⁵ of the holder B⁶, with which the coring-knife B⁷ is connected. The lever B⁴ has a foot B⁸, that in the movement of the carriage B' contacts with the under side of a track $a$, suitably connected with the frame A to tip said lever and place the corer in its operative and inoperative positions at the proper times, all in usual manner. To the lower end of the depending arm B² by a bolt C is connected the stripper C' for stripping the apple from the coring-knife.

The carriage B' has a depending leg C², that enters the guideway of the track A⁸ and travels therein as the carriage is moved chiefly by the radius-bar D and a mutilated gear, to be described. The radius-bar is pivoted at D' on a stud extended from a block D², connected with the frame by a bolt D³.

The carriage has a stud $D^4$, that is embraced loosely by the slotted upper end of the radius-bar. The radius-bar at its rear side has two cam-shaped flanges $D^5$ and $D^6$ of the peculiar shape shown in Figs. 1 and 3. The carriage has a stud $a^2$, that is extended through an ear $a^3$ of a stand $a^4$, having suitable bearings $a^{4\times}$, that receive the rock-shaft $a^5$ of what is designated the "turn-table" $a^6$, said turn-table having a plurality of teeth $a^7$ $a^{7\times}$, that at proper times engage with the teeth $A^3$, extended from the framework. The turn-table is slotted at $a^8$, and in said slot is free to move the rod $b$, to the lower end of which is connected in usual manner the knife-carrier $b'$, carrying the usual blade or knife for paring the fruit. The upper end of the rod $b$ is hooked, as at $b^2$, and the downturned extremity of the hook enters a hole in an arm $b^3$, suitably clamped upon the upper end of the rock-shaft $a^5$, the bend in the upper end of the rod being sustained on a sort of knife-edge $b^4$, erected on the upper side of the arm $b^3$. The rod below said arm $b^3$ has fixed upon it an arm $b^5$, with which is connected one end of a spring $b^6$, the opposite end of the spring being connected with the end $a^{6\times}$ of the turn-table, so that said spring acts normally to hold the rod and paring-blade in the position Fig. 1 with relation to the turn-table, the rod moving outwardly in the slot $a^8$, as is required to adapt it to various-sized fruit being pared. To the rock-shaft $a^5$ I have clamped by a suitable screw a split collar $c$, having a cam $c'$, (see Fig. 7,) and by turning the collar about said rock-shaft I can limit the inward movement of the rod $b$ in the slot $a^8$ under the action of its spring, this being necessary to provide for different sizes of apples or fruit to be pared. The carriage has two outwardly-extended threaded bosses $d$ (see Fig. 7) to receive clamp-screws $d'$, that are extended through a clamping bar or device $d^2$, the position of which may be changed by rotating said screws.

The stand carrying the rock-shaft of the turn-table is provided with a wedge or incline $d^3$, (shown best in Fig. 5,) which as the stand is moved about its pivot $e$ is driven into the space between the frame and the bar $d^2$, which forms a lock to hold the turn-table steadily in its working position for paring to thereby obviate any jumping or trembling of the turn-table during paring. The stand has projecting from its rear side (see Fig. 5) a stud $e$, that travels as the carriage is moved inwardly during the paring of fruit in the horizontal part of a slot $e'$, represented in the framework A, the outer end of said slot being upturned (see Fig. 6) to act upon said stud to tip the stand and turn-table into full-line position, Fig. 1, when the carriage arrives in its extreme outer position, as represented. By tipping the stand and turn-table the knife-carrier is moved farther from the bud end of the apple and affords a longer time for the application to the usual fruit-fork E of the fruit to be pared than though the stand and turn-table remained in its vertical position.

The usual teeth at the rear side of the disk or bevel-gear E', sustained on a stud $E^2$, fixed in suitable manner to the framework, are engaged by a bevel-gear $E^3$, (shown by dotted lines in Fig. 1,) connected with the hub of a toothed gear $E^4$, shown as having a handle $E^5$, but which when the machine is to be a power-driven machine may be rotated by power in any usual manner. The gear $E^4$ engages a pinion $E^6$, fast on the end of the fork-shaft $A^7$, and rotates the same in usual manner. The bevel-gear has at its rear side a mutilated gear H. (Shown by dotted lines in Fig. 1.) This gear engages the teeth H', depending from the carriage B', just before the stud leaves the cam-ledge $D^6$, so that the inward movement of the carriage is made positive for its full stroke.

Behind the bearing-plates $A^5$ and underneath the track-frame I have located a slide-bar $m$, having a downturned end $m'$ and an upturned projection $m^2$, (see full lines, Fig. 2,) which latter projection is struck by the crank pin or stud $f$ just as the latter strikes the portion $h$ of the cam-ledge to start the radius-bar D and the carriage B' outwardly after paring an apple. In this way the crank-pin slides the bar $m$ in the direction of the arrow thereon, Fig. 1, causing its end $m'$ to act against the rear end of the core-discharger $m^4$ and force the same outwardly, as shown in Fig. 1, to discharge the core from the fork.

Let it be supposed that an apple has been applied to the fork while the paring-blade and coring-knife occupy the position shown by full lines and that the stud $f$ of the bevel-toothed wheel E' is substantially in contact with the inner side of the upper cam-ledge $D^6$ of the radius-bar D, as shown in Fig. 1. Now as the bevel-wheel is turned in the direction of the arrow the stud acting upon the inner side of the cam-ledge $D^6$ immediately starts the radius-bar D and draws the carriage B' inwardly or to the left. During this operation the roller-stud $e$ travels down the portion $e^\times$ of the groove $e'$ in the framework, and the stand $a^4$ is brought into substantially its vertical position, and the knife-blade is made to contact with the bud end of the apple, the spring yielding more or less according to the size of the apple, and in this movement of the stand the first tooth $A^3$ of the teeth extended from the frame is made to contact with the outer right-hand tooth of the turn-table which starts to revolve the turn-table and carry the knife-blade and knife from the bud end of the apple around onto the body thereof, this being done through the movement of the slide to the left by moving the radius-bar. The stud $f$ continues to act upon the radius-bar D in moving the slide-bar to the left while paring the bud end of apple and a part of the side thereof, and after the paring-blade gets well onto the side of the apple the stud carries the radius-bar D into the position shown in dotted lines, and then the stud passes out from between the two cam-ledges D⁵ and D⁶, and immediately the teeth of the mutilated gear engage the teeth H', (see Fig. 4,) and thereafter the mutilated gear draws the slide-bar to the left, Figs. 1 and 4, while the remaining portion of the apple is pared. The paring having been completed, the final movement of the carriage to the left takes place, forcing the coring-knife into the apple. As soon, however, as the stud $f$ in the continued movement of the bevel-gear arrives in contact with the portion $h$ of the cam-ledges D⁵ said stud moves said lever to the right, Fig. 1, quickly, so as to move the carriage outwardly at a fast speed, withdrawing the coring-knife from the fork and taking with it the apple and tipping the stand, turn-table, and paring-knife into inoperative position farthest from the end of the fork. The radius-bar and carriage are started outwardly rapidly, while the stud acts upon the portion $h$ of the cam-ledge D⁵, and the stud having moved said radius-bar into its full-line position and also the carriage outwardly immediately crosses the groove and contacts with the cam-ledge D⁶ at its lower end, as represented in Fig. 1, and thereafter the radius-bar and carriage is started on its return stroke to move said carriage inwardly at a speed a little slower than that at which said carriage was moved outwardly, the speed of movement of the bar and carriage when being moved outwardly or to the left being a little slower after the knife strikes the bud end of the apple than the speed at which the carriage was started from its outward position inwardly. The blade of the knife-carrier begins to work on and pare the end of the apple as the radius-bar acted upon by the crank-pin is beginning to be moved at its slowest speed, and consequently the knife after meeting the end of the apple travels at its slowest speed to about the center line of the side of the apple, during which time the turn-table is partially revolved, thus bringing the blade of the knife against the side of the apple. About as the blade meets the side of the apple at about its largest diameter the mutilated gear referred to by engaging the teeth of the carriage assumes the control and movement thereof at a speed substantially the same as that given to the carriage while paring the apple from its bud end to about the middle of the apple between its ends.

In all other apple-parers known to me the change of the driving means for the carriage carrying the turn-table on its return motion is made while the knife of the parer is in contact with the bud end of the apple, and the change of driving means at such point results in a momentary dwell of the knife, which is apt to take off not only the paring, but also to unnecessarily cut away a portion of the apple, and to avoid this I have provided to change the driving means for the carriage on its return motion when the knife is in contact with the central part of the apple, thus obviating any dwell of the knife in contact with the bud end of the apple.

Having described my invention, what I claim, and desire to secure by Letters Patent, is—

1. In a fruit-parer, a frame, a carriage provided with depending teeth and having a turn-table provided with a paring-knife, a radius-bar pivoted at one end to said frame and loosely connected to the carriage at its other end, a rotating wheel provided with a stud to act upon said radius-bar and move it and the carriage outwardly after each paring operation, said radius-bar having a cam portion situated to be engaged by said stud after the carriage has been moved outwardly, whereby the continued rotation of the wheel starts the carriage inwardly, said cam portion being so shaped that this inward movement of the carriage continues until the blade pares the apple to about the middle of its length, and a mutilated gear positioned to engage the teeth of the carriage and continue its movement after the stud has left the cam portion on the radius-bar.

2. In an apple-parer, a carriage, means to move it outwardly and then backwardly for part of its stroke, a stand pivoted on said carriage and having bearings, a rock-shaft having a turn-table and mounted loosely in said bearings, said stand having a wedge-shaped projection, combined with a clamping-bar with which said wedge coacts as the stand is moved about its pivot to maintain the stand and its rock-shaft in vertical position.

In testimony whereof I have signed my name to this specification in the presence of two subscribing witnesses.

DAVID F. HUNT.

Witnesses:
HENRY A. HURLIN,
M. J. ABBOTT.